United States Patent

[11] 3,589,112

| [72] | Inventor | Lester H. Frohmader<br>R.#8, Box 114, Rockford, Ill. 61103 |
|---|---|---|
| [21] | Appl. No. | 852,620 |
| [22] | Filed | Aug. 25, 1969 |
| [45] | Patented | June 29, 1971 |

[54] THATCHER ATTACHMENT FOR ROTARY TYPE LAWNMOWER
10 Claims, 5 Drawing Figs.

[52] U.S. Cl. .................................................. 56/17.5, 56/295, 56/400, 172/42, 56/16.7
[51] Int. Cl. .................................................. A01d 51/00
[50] Field of Search .......................................... 56/27, 295, 400, 377; 172/42, 111

[56] References Cited
UNITED STATES PATENTS

| 2,486,766 | 11/1949 | Stenzel | 56/27 |
| 2,909,888 | 10/1959 | Van der Lely et al. | 56/377 |
| 3,015,929 | 1/1962 | Bright | 56/295 X |
| 3,117,633 | 1/1964 | Hosek | 172/42 |
| 3,367,093 | 2/1968 | Zwickel | 56/27 |

Primary Examiner—Russell R. Kinsey
Attorney—Andrew F. Wintercorn

ABSTRACT: A pair of generally V-shaped spring wire rake members are carried at the same radius on opposite ends of an elongated bar that is mounted at its midpoint on the lower end of the vertical driven shaft of the mower in lieu of the cutter blade. The rake members are both pivoted on vertical axes at their apex points to the underside of the bar to enable their swinging horizontally out of the way of any stone or other obstruction that might otherwise cause serious damage thereto and yet allow instant return of the rake members so deflected to normal radial operative position under centrifugal force, and the downwardly curved outer ends of each rake member are flexed upwardly by contact with the ground and are thusly maintained under spring pressure against the surface being raked and they operate at different radii to greatly increase the raking effectiveness of the attachment. Should either or both of the spring wire rake members be broken, or so badly bent out of shape as to require replacement, that is an easy matter as they are detachably secured in place by small bolts. These are shouldered to insure leaving the right amount of working clearance for pivotal movement of each rake member relative to the bar, regardless of how tightly the nuts may be fastened on the bolts.

PATENTED JUN29 1971 3,589,112

INVENTOR:
LESTER H. FROHMADER

*Andrew H. Wintercorn*
ATTORNEY

THATCHER ATTACHMENT FOR ROTARY TYPE LAWNMOWER

This invention relates to thatcher or raking attachments for rotary-type lawnmowers, and has for its principal object the provision of a simple and economical attachment consisting of a bar designed to replace the cutter bar and having at its opposite ends spring wire rake members of generally V-shape pivotally mounted at their apex points on the underside of the bar on vertical axes, so that they are free to be deflected horizontally out of the way of a stone or other obstruction instead of suffering serious damage and yet can swing back to operative position promptly thereafter under centrifugal force to resume their work. The arms of each V-shaped spring wire rake member terminate in downwardly curved outer ends that are deflected upwardly by contact with the ground so as to be maintained under spring pressure against the surface being raked, and, since the arms of each rake member are of different length, there is a big increase in the raking effectiveness of the attachment. The rake members are durable but can be replaced readily and at low cost when broken or bent too badly out of shape.

The invention is illustrated in the accompanying drawing, in which.

Figure 3:
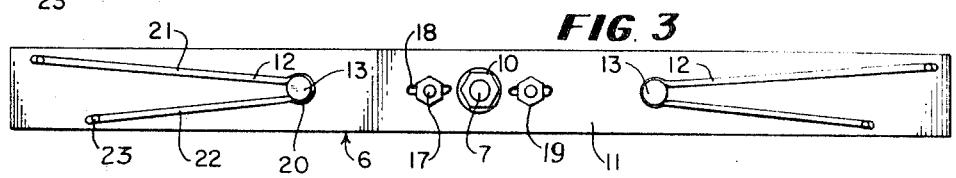
Figure 4:
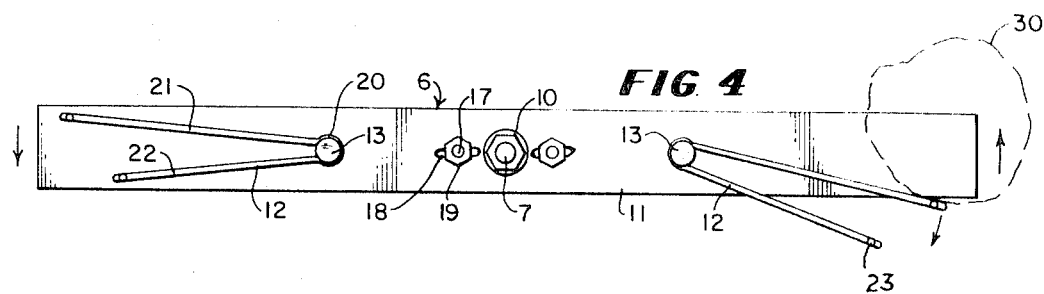
Figure 5:
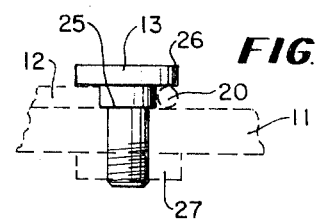

FIGS. 3 and 4 are bottom views of the attachment, FIG. 4 illustrating how contact with a stone or other obstruction may cause a rake member to be deflected temporarily from its normal radial position to get out of the way of the obstruction and thereby avoid bending or breakage, the pivoted rake member so deflected thereafter returning promptly to its normal radial operative position, and FIG. 5 is a side view of one of the shouldered bolts for pivotally and detachably mounting the rake members on the bar, the operating clearance for the rake members relative to the bar being thereby assured regardless of how much the nut may be tightened.

The same reference numerals are applied to corresponding parts throughout the views.

Referring to the drawing, the reference numeral 6 designates the thatcher or raking attachment of my invention generally, shown applied to the lower end of the vertical driven shaft 7 of a conventional rotary-type lawnmower 8, the motor 9 of which, of course, drives shaft 7. The usual cutter bar must, of course, be removed by removal of nut 10 before the thatcher attachment, consisting of an elongated bar 11 carrying a pair of V-shaped spring wire rake members 12 on bolts 13, can be mounted on the shaft 7 in abutment with flange 14 and secured in place by means of the nut 10. The flange 14 is part of the usual collar 15 keyed, as at 16, to the shaft 7, and the flange has a pair of bolts 17 which extend through diametrically opposed radial slots 18 in the bar 11 to prevent turning of the bar relative to the shaft 7, these bolts having nuts 19 fastened thereon.

Figure 2:
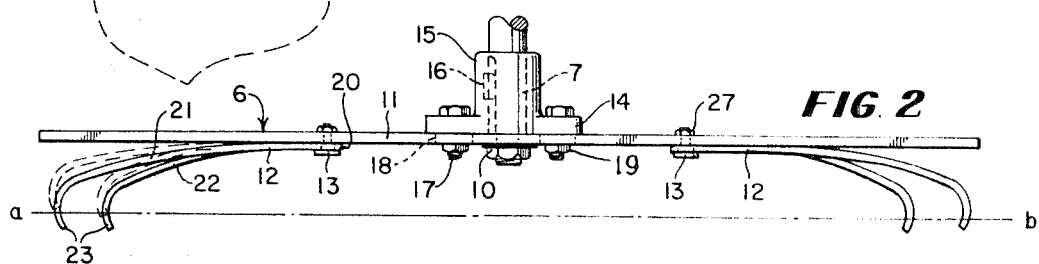
FIG. 2 is a side view of the attachment indicating in full lines the normal unstressed or free position of the outer ends of the spring wire rake members, and in dotted lines the extent to which they are deflected upwardly by contact with the surface a—b being raked so as to operate under downward spring pressure for good raking efficiency.

Each of the V-shaped spring wire rake members 12 has a circular bearing eye 20 defined at the apex of the V for pivotal bearing connection with its bolt 13 on a vertical axis, and provides two diverging spring arms 21 and 22 of different length, both having similar downwardly curved ground engaging outer end portions 23 which are held in spring pressed engagement with the ground, indicated by the dot-and-dash line a—b in FIG. 2, the extent to which the arms 21 and 22 are deflected by reason of their raking contact with the ground being shown by the dotted line positions of the arms of the rake member 12 on the left. Of course, just as one may control by adjustment of the elevation of the circular housing 24 of the mower how short or how long the grass will be cut by the rotary cutter blade (not shown), it follows that by similar height adjustment of the mower housing 24 as by adjustments A of any conventional or preferred type for changing the elevation of the wheels W relative to the mower 8, one can vary the downward spring pressure of the rake members 12 by similarly varying the spaced relationship of the bar 11 to the surface a—b being raked. The bolts 13, on which the rakes 12 are pivoted at their inner or apex ends 20 are provided with annular shoulders 25 in a predetermined spaced relationship to the head ends 26, thereby insuring the right operating clearance with respect to the underside of the bar 11 for only a predetermined resistance to pivotal movement regardless of how tightly the nut 27 fastening the bolt 13 to the bar may be tightened. This is very important because of the need for just enough but not too much freedom of oscillatory movement of the rakes in operation, as will now be described.

Figure 1:
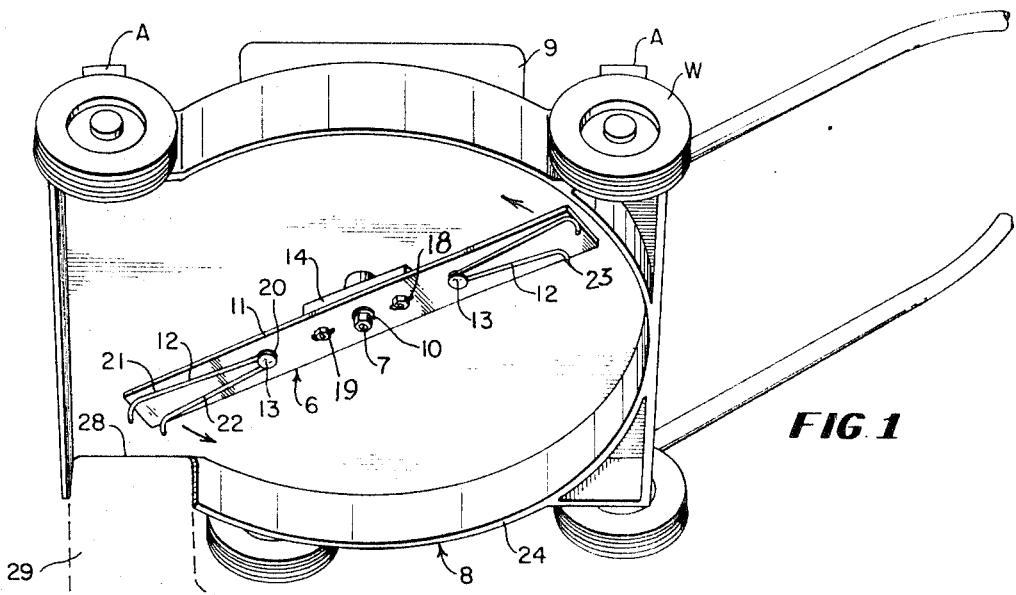
FIG. 1 is a perspective view of the underside of a rotary-type lawnmower equipped with the thatcher attachment of my invention.

In operation, the present attachment is used only when the lawn requires cleaning. The spring wire rakes 12 normally remain in alignment with the bar 11 and move in a circle as the bar 11, on the bottom of which they are mounted, turns with the driven shaft 7, and they remain in such alignment with the bar partly by reason of frictional resistance to pivotal movement and partly by centrifugal force under the normal amount of their frictional engagement with the ground as they rake out the dead grass, sticks, stones and other debris hindering the healthy growth of the grass and interfering with its easy fertilization and watering, meanwhile loosening and aerating the soil around the individual grass plants to further benefit the health of the lawn as a whole. A good share of the debris will be thrown off the rakes 12 through the outlet opening 28 partly by centrifugal action and partly by the fan action of the rotating bar 11, similarly as grass clippings are discharged through this opening in mowing. For that reason a catcher bag should be used on the mower, as indicated in dotted lines at 29 in FIG. 1. Whatever debris remains on the lawn surface can be collected with a sweeper or by hand raking. If it is evident that the rakes 12 are digging too deep, the wheels should be adjusted to elevate the bar 11 accordingly, and vice versa. If, in the operation of the rakes 12, a large stone or other heavy obstruction indicated at 30 in FIG. 4 is struck by either or both of the rakes 12, they are usually deflected enough to pass the obstruction, thereby avoiding damage or breakage and, once past the obstruction, they swing outwardly under centrifugal force to their normal operative position. The noise occasioned by the rakes striking such an obstruction is usually enough to signal the operator to locate and dig out the obstruction and thus further improve the lawn. Whenever, by reason of hard enough or long enough usage, one or both of the rakes 12 require replacement, that is a simple matter as it involves only removing nuts 27 and bolts 13 in order to remove the bent or broken rake or rakes 12, and these should be available at a comparable low cost as spring wire tines for hand-operated rakes.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. An attachment for use with a rotary-type lawnmower a portable substantially horizontal housing open on the bottom and carrying a motor on the top thereof that is adapted to drive an elongated horizontal cutting blade supported at its midpoint on and rotatable on a substantially vertical axis in said housing, said attachment comprising an elongated horizontal bar adapted to be operated substantially at the level of a cutting blade and supported at its midpoint for rotation on a substantially vertical axis in said housing, and generally V-shaped rake members mounted substantially horizontally by their apex portions on the bottom of said bar in equally spaced relation to and on opposite sides of said midpoint and extending outwardly and downwardly for raking contact with the ground.

2. An attachment as set forth in claim 1 wherein one arm of each V-shaped rake member is longer than the other so that their outer ends rake at different radii in said housing.

3. An attachment as set forth in claim 1 wherein said rake members are of spring wire construction and are so disposed as to elevation with respect to the ground level that the outer ends are deflected upwardly by contact with the ground, thereby causing raking contact with the ground under a predetermined spring pressure.

4. An attachment as set forth in claim 1 wherein said rake members are of spring wire construction and are so disposed as to elevation with respect to the ground level that the outer ends are deflected upwardly by contact with the ground, thereby causing raking contact with the ground under a predetermined spring pressure, the elevation of said bar relative to the ground being adjustable to increase or decrease the spring pressure.

5. An attachment as set forth in claim 1 wherein said rake members are of spring wire construction and are so disposed as to elevation with respect to the ground level that the outer ends are deflected upwardly by contact with the ground, thereby causing raking contact with the ground under a predetermined spring pressure, the elevation of said bar relative to the ground being adjustable by change in elevation of said housing to increase or decrease the spring pressure.

6. An attachment as set forth in claim 1 wherein said rake members are of spring wire construction and are so disposed as to elevation with respect to the ground level that the outer ends are deflected upwardly by contact with the ground, thereby causing raking contact with the ground under a predetermined spring pressure, the arms of each of said rake members being of different length so that their outer ends rake at different radii in said housing.

7. An attachment as set forth in claim 1 wherein the elongated bar carrying the rake members is substituted for the cutting blade.

8. An attachment as set forth in claim 1 wherein the rake members are pivotally mounted at their apex points on said bar on substantially vertical axes with freedom to swing out of the way of an obstruction upon contact therewith and then return under centrifugal force to their normal operative position in alignment with the bar.

9. An attachment as set forth in claim 8 wherein the rake members are held with a predetermined friction in their normal operative position in alignment with the bar so that anticipated side thrust on said members in performing the raking function is not enough to cause said rake members to swing out of aligned relationship to said bar.

10. As an article of manufacture, a spring wire rake member of generally V-shape, having a substantially horizontal circular bearing eye defined at its apex end in substantially coplanar relationship with the two diverging rake arms that are integral therewith, said arms being of different lengths, each terminating in a downwardly curved outer end portion for raking purposes.